United States Patent [19]
Dewhirst et al.

[11] Patent Number: 4,660,204
[45] Date of Patent: Apr. 21, 1987

[54] $CO_2$ TEA LASER UTILIZING AN INTRA-CAVITY PRISM Q-SWITCH

[75] Inventors: Donald R. Dewhirst; Robert L. Duvall, III, both of Torrance, Calif.

[73] Assignee: Hughes Aircraft Company, Los Angeles, Calif.

[21] Appl. No.: 637,097

[22] Filed: Aug. 2, 1984

[51] Int. Cl.⁴ .............................................. H01S 3/125
[52] U.S. Cl. ......................................... 372/16; 372/24; 372/107; 372/99; 372/20; 372/100; 372/101
[58] Field of Search ..................... 372/25, 16, 99, 107, 372/20, 10, 12, 100, 101, 98, 24, 6

[56] References Cited

U.S. PATENT DOCUMENTS 3,548,337 12/1970 Gates et al. ............................ 372/16
3,711,788 1/1973 Forkner ................................ 372/100
3,725,817 4/1973 Nolan ................................... 372/16

OTHER PUBLICATIONS

Snowball; "Electronic Control of Flash-Tube Firing Time in a Spinning-Prism Q-Switched Laser", Electronic Eng., p. 120, Mar. 1968.

Primary Examiner—Leon Scott, Jr.
Attorney, Agent, or Firm—Sternfels Lewis B.; A. W. Karambelas

[57] ABSTRACT

A $CO_2$ TEA laser utilizing an intra-cavity rotating prism Q-switch (70) for angularly switching the resonator gain by periodically causing the resonator mirrors (54, 56) to be in alignment. An opto-electronic timing device (79), which includes a graded index glass rod (76) rotating with the Q-switch prism, generates a pulse to initiate the laser discharge at the proper time before the mirrors are aligned so that the laser output pulse occurs when peak gain is achieved. The Q-switch speed of rotation is chosen such that the time interval in which the mirrors are aligned is not long enough to support the tail portion of the pulse typical of the gain switched $CO_2$ TEA laser.

15 Claims, 7 Drawing Figures

CO₂ TEA LASER UTILIZING AN INTRA-CAVITY PRISM Q-SWITCH

BACKGROUND OF THE INVENTION

1. Field of the Invention

The present invention relates to a rotating prism Q-switch for use with $CO_2$ TEA (carbon dioxide transversely excited atmospheric) lasers. The rotating prism Q-switch angularly sweeps through alignment with the resonator mirrors once per revolution. An opto-electronic timing device with imaging optics rotating with the prism triggers the gas discharge at the proper time prior to resonator alignment.

2. Description of Related Art

The $CO_2$ laser has long been available and can be configured to produce a continuous or pulsed laser beam. It is capable of high average power output while at the same time maintaining the high degree of spectral purity and spatial coherence, characteristics of the lower power atomic gas lasers. An electric discharge is the most common means of excitation. Operating efficiency and output power are greatly increased by adding nitrogen and helium to the fill gas. Helium aids depopulation of the terminal laser level and nitrogen excites the carbon dioxide molecules by collisional energy transfer. To facilitate the discharge, the CW (continuous-wave) excited $CO_2$ laser is operated at low pressure, on the order of 100 torr.

Because of the long lifetime of the vibration levels, it is possible to store energy in the discharge medium by blocking the path of the laser beam within the resonator, thereby preventing the laser oscillation. If the block is suddenly removed, then the output from the laser occurs in the form of a sharp pulse with peak power two to three orders of magnitude larger than the average continuous-wave power obtainable from this laser. This mode of operation is called Q-switching. In a typical prior art device in which the gas is excited by CW discharge, Q-switching is accomplished by replacing one of the laser cavity mirrors with a rotating mirror. A laser pulse at 10.6 microns is produced every time the rotating mirror lines up with the opposite stationary mirror.

A more efficient method of producing high peak power pulses from the $CO_2$ TEA laser is the use of a pulsed high voltage discharge in a gas medium at much higher pressure. As is known, a $CO_2$ TEA (transversely excited atmospheric) laser is a type of $CO_2$ laser in which excitation of the active medium is transverse to the laser beam axis and, because of a shorter breakdown length, can operate in a gas pressure range higher than that for longitudinally excited gas lasers, thus achieving a higher power output per unit volume because of the greater density of lasing molecules. In this laser the gas pressure is near one atmosphere and the discharge is very fast and transverse to the beam axis. By operating at higher pressure, the density of excited $CO_2$ molecules is increased, thereby proportionally increasing the peak power output. The difficulty of creating the discharge in the higher pressure gas is offset by the reduced path length of the transverse discharge. The high peak power of the $CO_2$ TEA laser is not accomplished by a Q-switch, but results from the fast discharge which causes the gain to build up faster than the laser pulse. This method is called "gain switching."

The fast discharge method is undesirable for many laser applications because sufficient nitrogen excitation remains after the initial laser pulse to sustain laser oscillation at a power level 1/10 to ¼ of the peak. The output energy after the main pulse is referred to as the "tail" and typically contains more than half the energy and lasts up to several microseconds. In laser range finder applications, the tail is backscattered into the receiver, thus "blinding" the receiver for the few microseconds that the tail exists, which blinding is unacceptable.

The tail can be eliminated by the addition of a Q-switch wherein the Q-switch is on for the main pulse, and then turned off to prevent the tail. The Q-switch also can increase the peak output power by delaying the switch opening so that the laser pulse occurs near peak gain. For the gain switched laser, the pulse can occur well before peak gain, thus increasing the tail energy.

Since the $CO_2$ TEA laser has an excited state lifetime of only a few microseconds, a timing accuracy of a few hundred nanoseconds is required for the time delay between the gas discharge and Q-switch opening. Heretofore, only the electro-optic Q-switch was capable of providing this degree of timing accuracy. However, the electro-optic Q-switch has serious disadvantages when used with $CO_2$ TEA lasers due to its cost, complexity, fragility and susceptibility to laser damage.

What is desired is an arrangement wherein a Q-switch can be utilized with the $CO_2$ TEA laser without the aforementioned disadvantages of the electro-optic Q-switch, the timing accuracy required for laser operation still being provided.

SUMMARY OF THE INVENTION

The present invention provides a $CO_2$ TEA type laser which is adopted to operate with a simple rotating prism Q-switch. The rotating prism Q-switch is interposed between the laser resonator mirrors and is arranged such that rotation of the Q-switch sweeps the resonator mirrors through alignment with one another once each revolution of the Q-switch. The speed of rotation is selected so that the time interval of good resonator alignment is sufficient to allow for the main pulse buildup, but not long enough to support the tail.

An opto-electronic timing device provides a prealignment signal to initiate the gas discharge about 4 microseconds prior to resonator alignment. Imaging optics of the timing device comprise a graded index fiber optic rod mechanically attached to and rotating with the Q-switch prism. A timing pulse is generated by the timing device once every revolution of the rotating prism. The simultaneous presence of a laser enable signal and the timing pulse initiates the gas discharge to produce a laser pulse. Thus, the PRF is controlled by the laser enable signal. The relative angular position of the fiber optic rod and prism is selected such that the resonator mirrors are swept into alignment at near peak gain.

In a preferred embodiment of the invention, the Q-switch prism is arranged to fold the resonator into a "U" configuration so that the resonator mirrors can be placed close together for alignment stability. Further, the prism geometry is chosen to make the resonator alignment insensitive to small angular tilts of the prism about axes perpendicular to the axis of rotation. Other advantages of the rotating prism Q-switch compared to the electro-optic switch are simplicity, insensitivity to temperature and durability.

BRIEF DESCRIPTION OF THE DRAWINGS

For a better understanding of the invention as well as further features and objects thereof, reference is made to the following description which is to be read in conjunction with the accompanying drawings wherein.

The same reference numerals identify identical components in each of the figures.

DETAILED DESCRIPTION OF THE INVENTION

For purposes of understanding the background of the present invention, a discussion of some of the prior art $CO_2$ laser arrangements will be useful.

Figure 1:
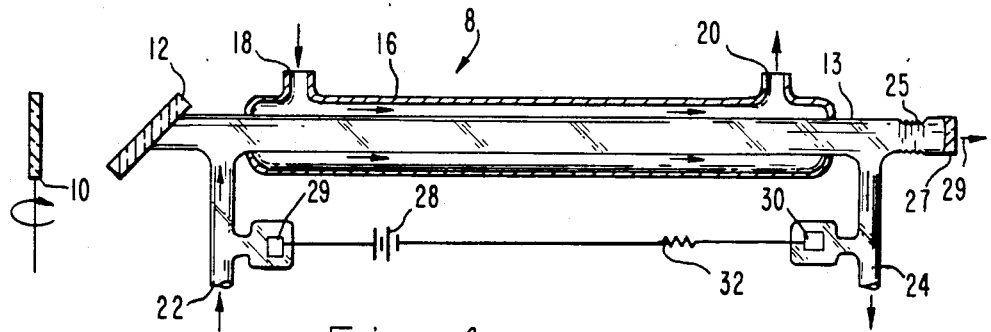
FIG. 1 is a simplified cross-sectional view of a prior art continuous wave $CO_2$ laser modified to use a rotating reflector as a Q-switch to produce a train of pulsed laser outputs.

FIG. 1 shows a prior art continuous wave high power carbon dioxide laser 8 modified to operate in the Q-switching mode by a rotating mirror. The advantages of operating a $CO_2$ type laser in the Q-switching mode has been described hereinabove with reference to the background portion of this application. In essence, Q-switching provides laser output pulses having a much higher peak power than provided by operating a $CO_2$ laser in the continuous wave mode. As illustrated in FIG. 1, Q-switching is accomplished by replacing one of the laser resonator mirrors with a rotating mirror 10. In the simplified version shown, laser 8 additionally includes a Brewster window 12, Pyrex tubing 13, a coolant (usually water) contained within an enclosure 16 having inlet and outlet ports 18 and 20, respectively, gas inlet ports 22 and 24, respectively, a flexible bellows 25 and an output mirror 27. A source of potential 28 is coupled between electrodes 29 and 30 in series with a resistor 32. A premixed gas, typically comprising $CO_2$, $N_2$ and He, is introduced into tubing 13 through inlet port 22. Mirror 27 is dielectrically coated and transmits laser radiation 29 of 10.6 microns.

In operation, mirror 10 is caused to rotate so that optical alignment of mirrors 10 and 27 occurs periodically. The continuous train of high peak power laser pulses are useful for certain cutting and machining operations, optical communications and optical radar.

Figure 2:
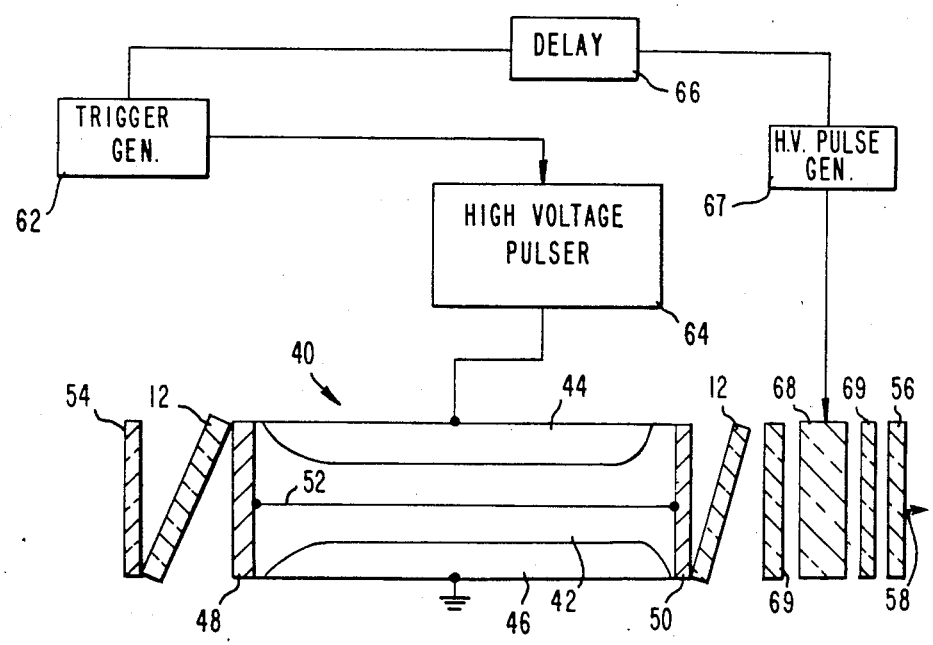
FIG. 2 is a simplified cross-sectional view of a prior art $CO_2$ TEA laser modified to use an electro-optic Q-switch.

FIG. 2 illustrates a $CO_2$ TEA laser 40 using fast discharge electric excitation. For purposes of simplicity, the gas coolant inlet and outlet ports and cooling devices (if any) have not been illustrated. Laser 40 may use water cooling and/or circulate the gas through a heat exchanger for high pulse repetition frequency (PRF) operation. The laser gas mixture is introduced to Pyrex tubing 42 at or near one atmospheric pressure. Laser 40 supports parallel plate electrodes 44 and 46 and has ceramic capacitors 48 and 50 mounted at each end. A pre-ionization trigger wire 52 extends between capacitors 48 and 50. A fully reflecting mirror 54 and a partially reflecting mirror 56 are arranged adjacent to the ends of laser 40 to form the optical resonator cavity. Laser output 58 at 10.6 microns is transmitted by output mirror 56.

In operation, a trigger generator 62 energizes high voltage pulses in a pulser 64, the output of which is applied to metal electrode 44. A high voltage pulse produced by pulser 64 ionizes the gas within tubing or envelope 42 causing a glow discharge to occur, the glow discharge causing the active medium ($CO_2$ molecules in this case) to be excited to a population inversion condition to provide for laser operation. Trigger generator 62 also activates a high voltage pulse generator 67 to apply a high voltage pulse to an optical shutter device 68 after a time delay provided by a time delay device 66. Optical shutter device 68 is the electro-optic Q-switch described hereinabove and is effective to prohibit transmission of the laser light within the laser resonator, formed my mirrors 54 and 56, unless it is turned on. Shutter 68 typically comprises a CdTe electro-optical crystal with polarizers 69 at each end. Shutter 68 transmits laser light at 10.6 microns when a high voltage pulse from H.V. pulse generator 67 is applied thereto, such high voltage typically being a pulse of fixed time duration. Time delay 66 is predetermined, and chosen to open shutter 68 to produce the laser pulse at a time when the gain medium is near maximum gain, thereby producing the maximum peak output power. The time duration of the high voltage pulse applied to shutter 68 is chosen to close shutter 68 just after the main pulse, thereby prohibiting the low intensity tail that normally would follow. Although accurate timing can be provided by the combination of delay element 66 and shutter 68, this combination is rarely used for $CO_2$ TEA lasers because of the cost, complexity, fragility and susceptibility to laser damage of the electro-optic shutter 68 and polarizer 69.

Figure 3:
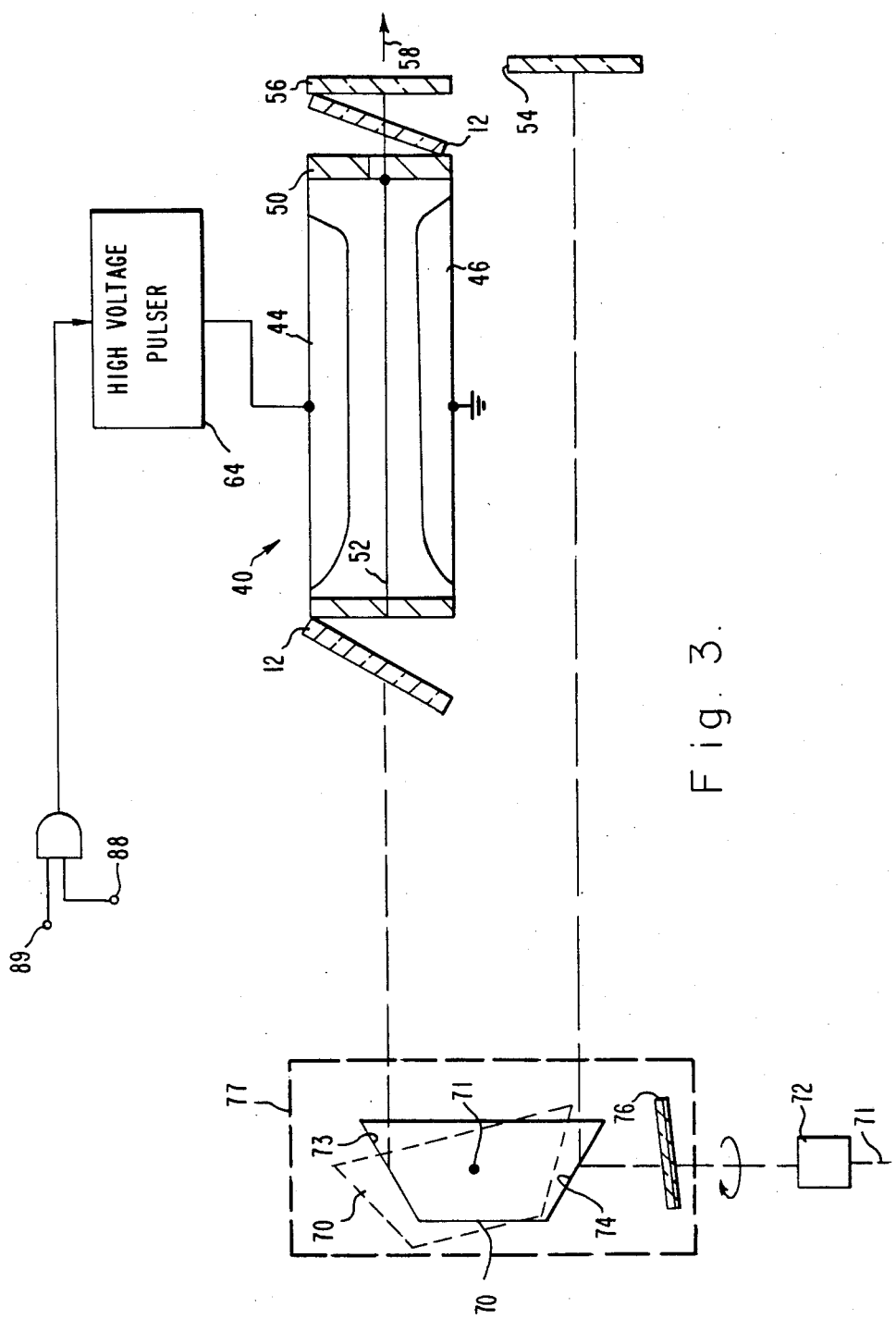
FIG. 3 is a partial cross-sectional view of a $CO_2$ TEA laser which utilizes a rotating prism Q-switch in accordance with the teachings of the present invention.

FIG. 3 illustrates the $CO_2$ TEA laser shown in FIG. 2 modified in accordance with the teachings of the present invention. It should be understood, however, that, although the present invention is directed to $CO_2$ TEA lasers, the invention can be utilized with other types of lasers that are Q-switched by a rotating prism where accurate timing of the gain medium excitation with the rotating prism is required. An intracavity Q-switch prism 70 is rotatable about axis 71 by motor 72.

Rotating prism 70 angularly switches the resonator gain by periodically sweeping through alignment with mirrors 54 and 56. For each combination of laser operating conditions (resonator length, gain, output, coupling, etc.), there is an optimum prism rotation speed. This is the angular speed with a "good" alignment time interval on the order of the pulse build up time where a single output pulse is produced. If too fast, the laser pulse has insufficient time to build up reducing the pulse output power. If not fast enough, multiple output pulses are produced.

Light generated in the resonator cavity formed between mirrors 54 and 56 is reflected by the inclined surfaces 73 and 74 of prism 70 in a manner such that prism 70 folds the resonator into a "U" configuration. In the preferred embodiment, the folded resonator permits mirrors 54 and 56 to be positioned close together for alignment stability. For example, mirrors 54 and 56, although shown as separate components, can be combined into a single mirror formed within a rigid frame member, one portion of the mirror having a partially transmitting coating, and the other portion of the mirror having a totally reflecting coating. Thus, if the frame containing the single mirror is subjected to thermal or mechanical stresses, the same change in alignment is transmitted to both mirror portions, to effectively cancel out any stress-caused misalignment of the laser resonator. The prism geometry is retroreflective to make the resonator alignment unaffected by small angular displacements of the prism about its nonrotating axes. For example, if prism 70 is displaced to the position shown by the dashed lines, the relative angular alignment between incident and reflected rays are unchanged. Since resonator mirrors 54 and 56 are swept through alignment with each other about the prism rotation axis, the resonator alignment is not affected by small angular tilts of mirrors 54 and 56 if they are moved as a single mirror relative to the prism.

Figure 4:
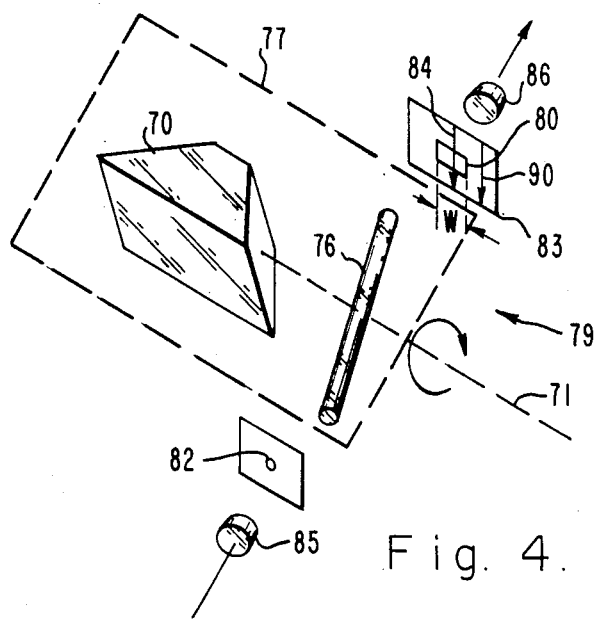
FIG. 4 is a simplified optical schematic of the components which comprise the opto-electronic timing device of the present invention.

FIG. 4 shows an opto-electronic timing device 79 constructed in accordance with the teachings of the present invention. A significant difference exists between the electro-optic and rotating prism Q-switches in which, for the prism switch, a laser pulse can only occur at times in which the prism is aligned with the resonator mirrors. Timing device 79 generates a prealignment signal to trigger the discharge at the proper time before prism alignment. The required lead time for a $CO_2$ TEA laser typically is about 4 microseconds with 10% maximum variation (repeatability of pulse initiation time) to minimize the shot-to-shot variance of the output power. Prior to the present invention, a rotating prism Q-switch was not capable of being used in $CO_2$ TEA lasers because of the gas discharge timing problem.

Timing device 79 comprises a graded index glass rod 76, a slit 80 in its associated plane 83, a pinhole 82, an LED source 85 and a photodetector 86. Graded index rod 76 (such as a SELFOC fiber optic rod manufactured by the Nippon Sheet Glass Company, Ltd., Tokyo, Japan) has a radial index of refraction which is parabolic in that the index of refraction of the core is greatest on its optical axis and continuously decreases towards its periphery. As such, rod 76 has the characteristics of a common spherical lens. The optical imaging properties are determined by rod length and source object location.

Slit 80 and pinhole 82 are placed at approximate equal distances from, and on a line through, axis of rotation 71. The pinhole slit separation and graded index rod length are chosen so that the rod forms an erect real image of the pinhole on plane 83 of the slit 80. It is necessary to form an erect rather than an inverted image because an inverted image of the pinhole 82 would be, due to the optics involved, stationary on slit plane 83 as rod 76 is rotated through alignment with pinhole 82. An erect image, on the other hand, is swept across slit 80 in the direction of arrow 84 as rod 76 is rotated through alignment. It should be noted that a pair of lenses (to provide an erect image), configured to form an optical relay, also may be utilized to accomplish the same function as rod 76; however, graded index rod 76 is the preferred technique because of its smaller size. The rear surface of pinhole 82 is continuously illuminated by LED light source 85 and the illuminated pinhole image is detected by PIN photodiode 86 on the rear surface of slit 80. The length of rod 76 and pinhole location determine the type of image, i.e., erect or inverted, formed at slit 80. The width W of slit 80 preferably is on the order of the image width, the length of the slit not being critical to the operation of the present invention. It should be noted that an LED with a small emitting area can be utilized, thus eliminating the need for pinhole 80 inasmuch as the pinhole is only utilized to define the image size. A small image is desired for good timing accuracy. Since it is desired only to generate one pulse per rotation of rod 76, the end for end ambiguity of rod 76 is eliminated by cutting one rod end at a slight angle so that the pinhole image does not sweep across PIN photodiode 86 for the incorrect rod orientation as illustrated by arrow 90.

In operation, when the pinhole image crosses slit 80 for the correct rod orientation, a pulse is generated by photodiode 86 which causes a logic level pulse to be coupled to terminal 88 (FIG. 3). When the laser is enabled by a logic signal at 89, the logic pulse at terminal 88 energizes high voltage pulser 64, causing the gas discharge to form in $CO_2$ TEA laser 40 as described hereinabove and illustrated in FIG. 2 for the electro-optic Q-switch.

Figure 5:
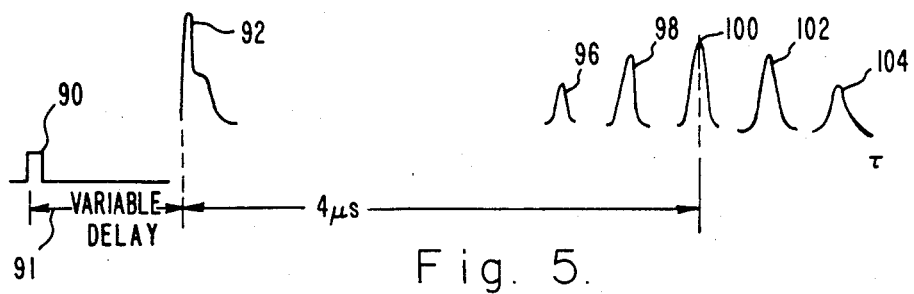
FIG. 5 is a timing diagram illustrating the triggering pulse timing to initiate lasing of the $CO_2$ TEA laser shown in FIG. 3 and the resultant laser pulse output.

The relative angular relationship between the pinhole/slit combination, graded index rod, resonator mirrors and prism establishes the lead angle which, together with the prism rotation speed, determines the trigger pulse lead time. The lead angle is adjusted to trigger the gas discharge 4 microseconds before the prism alignment with the resonator mirrors. The lead angle is so small (typically about 0.2°) that the angle must be established by adjustment of the pinhole/slit orientation, peaking the laser output while the laser is fired at a convenient PRF. It also may be helpful to adjust the angle slightly greater than needed, and add a variable delay in the electronic circuitry after the photodiode output trigger signal. The timing sequence is shown in FIG. 5 where 90 is the photodiode trigger signal, 91 the variable delay and 92 the high voltage pulser output pulse. Laser output pulses arising from early-to-late pulse timing are illustrated in FIG. 5 as pulses 96, 98, 100 (optimum timing), 102 and 104. The output power was determined experimentally to be reduced by ½ for 1½ microseconds early or late pulse timing.

Pulse timing variation or "jitter" is an important parameter in the present invention and relates to shot-to-shot time variation between photodetector trigger pulse 92 and optimum laser pulse output time 100. The three largest sources of pulse jitter of timing device 79 are variations of the photodiode current pulse amplitude, prism rotation speed and time delays within the pulser itself. The contribution to pulse jitter of each of these can be reduced to under 100 nanoseconds by controlling the prism rotation speed to within 2%, proper design of the pulser electronics and pulse differentiating the photodiode output current pulse. With these controls, the shot-to-shot time jitter could be held to about 150 nanoseconds RMS, which is well within the requirement for a $CO_2$ TEA laser Q-switch.

A $CO_2$ TEA laser embodying the principles of the present invention has been constructed. The design values selected for timing device 79 are a rod length of 3 cm, a pinhole/slit separation of approximately 5 cm and pinhole/slit width of 100 micrometers. The optimum prism rate of rotation for the device constructed was determined to be approximately 7,500 rpm.

Figure 6A:
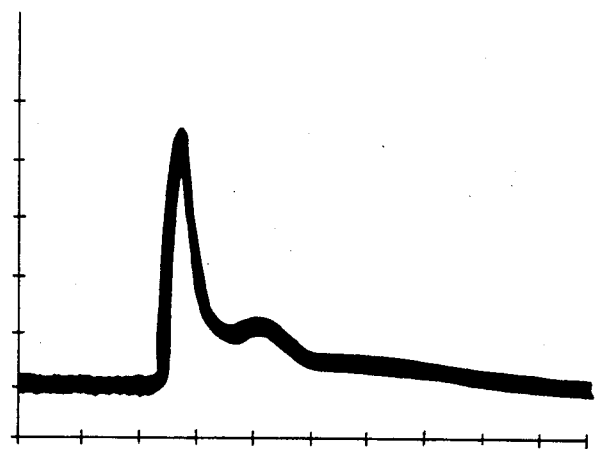
FIGS. 6a and 6b are reproductions of photographs of $CO_2$ TEA laser temporal pulse shape respectively gain switched (FIG. 6a) and Q-switched (FIG. 6b), both of whose scales are 200 nanoseconds per division horizontally and 60 KW per division vertically.
Figure 6B:
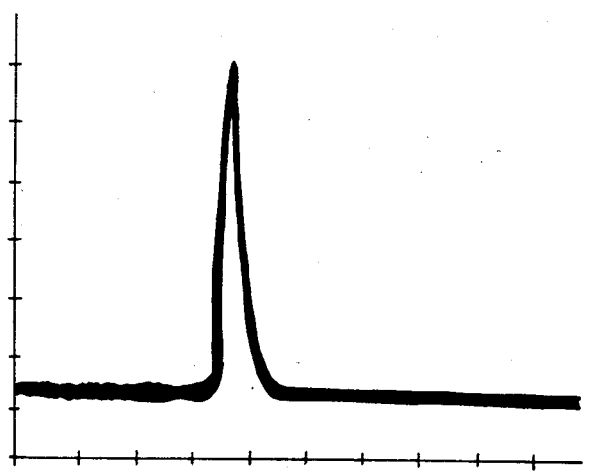

The performance of the device constructed for test is excellent. The main pulse energy and power were increased and the tail completely eliminated. With the prism held stationary and aligned with mirrors 54 and 56, the laser is gain switched and the pulse shape is the typical main pulse followed by a tail of a few microseconds duration. When Q-switched, the output is a single pulse of about 70 nanoseconds pulse width. The output energy of the Q-switch laser (the prism rotating at 7,500 rpm) was 23 millijoules compared to 38 millijoules for the gain switched embodiment in which half of the energy is in the tail. The peak power for 40 shots averaged 320 kilowatts (20% higher than for the gain switched laser) with a standard deviation of 25%. The high and low pulses were 400 and 220 kilowatts. The pulse timing jitter was about 350 nanoseconds RMS which was achieved with none of the pulse jitter control methods noted above. Oscilloscope photographs of the gain switched and Q-switched output pulses are shown in FIG. 6.

The present invention thus provides a $CO_2$ TEA laser wherein the peak power of the laser output pulse is increased and with the nitrogen tail, normally associated with fast discharge electric excitation techniques, eliminated. The opto-electronic timing method utilized in conjunction with the rotating prism Q-switch avoids the complexity, fragility and susceptibility to laser damage of electro-optic Q-switches.

While the invention has been described with reference to its preferred embodiments, it will be understood by those skilled in the art that various changes may be made, and equivalents may be substituted for elements thereof without departing from the true spirit and scope of the invention. In addition, many modifications may be made to adapt a particular situation or a material to the teaching of the invention without departing from its essential teachings.

What is claimed is:

1. Apparatus for controlling the resonator gain of a pulse laser device comprising:
    an envelope having a longitudinal axis and containing an active medium therein and resonator mirrors optically aligned with the longitudinal axis of said envelope, the resonator optical axis of said laser device being positioned to enable reflection of the laser pulse by a prism Q-switch interposed between said resonator mirrors, said Q-switch being rotatable about an axis and having retroreflective properties in axes orthogonal to the axis;
    means for rotating said prism Q-switch to periodically angularly align the resonator mirrors of said laser by the rotating prism; and
    a graded index optical imaging device, including means for converting optical to electrical energy, coupled to said rotating means for forming an image of a light source which is caused to sweep across a photodetector by rotation of said switch and for generating a timed electrical pulse for energizing the laser active medium, said optical imaging device having an angular relationship with respect to the resonator optical axis to establish a lead angle, the timing of the electrical pulse to be so arranged as to cause the alignment of said switch to occur when said active medium has achieved peak gain.

2. The apparatus of claim 1 wherein said optical imaging device is formed by a graded index rod coupled to said rotating means.

3. The apparatus of claim 1 wherein the light source is a backlighted pinhole or a small aperture LED and the image is formed on a slit positioned in front of the photodetector.

4. The apparatus of claim 3 wherein the pinhole and slit locations and the length of said graded index rod are chosen such that the rod forms an erect real image of the pinhole on the plane of the slit.

5. The apparatus of claim 4 wherein one end of the graded index rod is cut at an angle such that the pinhole image enters the photodiode only once for each revolution of said prism Q-switch.

6. The apparatus of claim 5 wherein the output of said photodiode is differentiated prior to energizing said laser active medium.

7. The apparatus of claim 1 wherein said Q-switch prism is placed on one end of the resonator and configured such that said resonator mirrors can be placed adjacent to each other on the opposite end, thus providing alignment stability of the laser resonator.

8. The apparatus of claim 1 in which said laser comprises a $CO_2$ TEA laser having a main pulse and a residual tail, and the Q-switch is rotated to provide a speed which is selected to eliminate the tail.

9. The apparatus of claim 7 in which said optical imaging device comprises an image of a light source which is caused to sweep across a photodetector by rotation of said switch, thereby producing said electrical pulse.

10. The apparatus of claim 9 in which said optical image is formed by a graded index rod coupled to said rotating means.

11. The apparatus of claim 10 in which the light source is a backlighted pinhole or a small aperture LED and the image is formed on a slit positioned in front of the photodetector.

12. The apparatus of claim 11 in which the pinhole and slit locations and the length of said graded index rod are chosen such that the rod forms an erect real image of the pinhole on the plane of the slit.

13. The apparatus of claim 12 in which one end of the graded index rod is cut at an angle such that the pinhole image enters the photodiode only once for each revolution of said prism Q-switch.

14. The apparatus of claim 13 in which the output of said photodiode is differentiated prior to energizing said laser active medium.

15. The apparatus of claim 14 in which said Q-switch prism is placed on one end of the resonator structure and configured such that said resonator mirrors can be placed adjacent to each other on the opposite end, thus providing alignment stability of the laser resonator.

* * * * *